United States Patent

[11] 3,596,589

| [72] | Inventor | Samuel Hertzberg<br>740 Grand Concourse, New York, N.Y. 10451 |
|---|---|---|
| [21] | Appl. No. | 836,797 |
| [22] | Filed | June 26, 1969 |
| [45] | Patented | Aug. 3, 1971 |

[54] COFFEEMAKERS
10 Claims, 19 Drawing Figs.

[52] U.S. Cl. .................................................. 99/286, 99/290
[51] Int. Cl. ................................................... A47j 31/42
[50] Field of Search ...................................... 49/286, 290, 313, 323

[56] References Cited
UNITED STATES PATENTS

| 1,789,334 | 1/1931 | Englung | 99/286 |
| 2,162,033 | 6/1939 | Schulze | 99/286 |
| 2,832,279 | 4/1958 | Terce | 99/286 |
| 3,153,377 | 10/1964 | Bosak | 99/290 X |

FOREIGN PATENTS

| 107,579 | 10/1927 | Austria | 99/286 |
| 151,518 | 3/1903 | Germany | 99/286 |

*Primary Examiner*—J. Karl Bell

ABSTRACT: Coffeemaker in which coffee may be brewed either by the open pot, the drip pot, or the percolator method. Consists of a bowl, a lid, and an internal structure emanating from the bowl interior and abutting the lid. The lid incorporates a coffee grinder. Two platforms, rotatably locked, fragment the coffee beans between cooperating milling surfaces, one platform maintained stationary while the other rotates subject to the application of torque. The coffee beans are infused through a center gap in the exterior platform and the ground coffee is voided from the exit lips of the platforms directly into the bowl interior. Water may have been previously placed in the bowl or it may be poured in through the aforesaid center gap after the grinding. The lid remains seated on the bowl during the grinding, the brewing, and the serving processes.

PATENTED AUG 3 1971
3,596,589
SHEET 1 OF 2
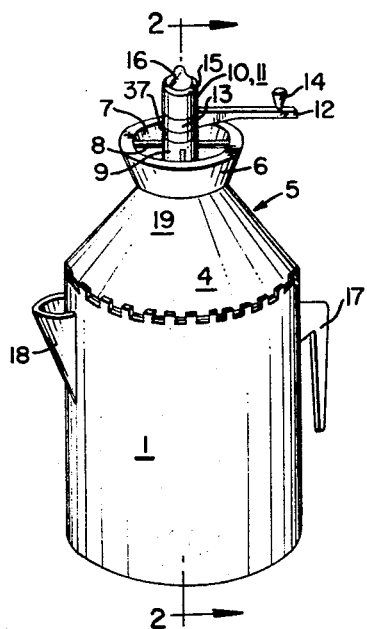
FIG.1
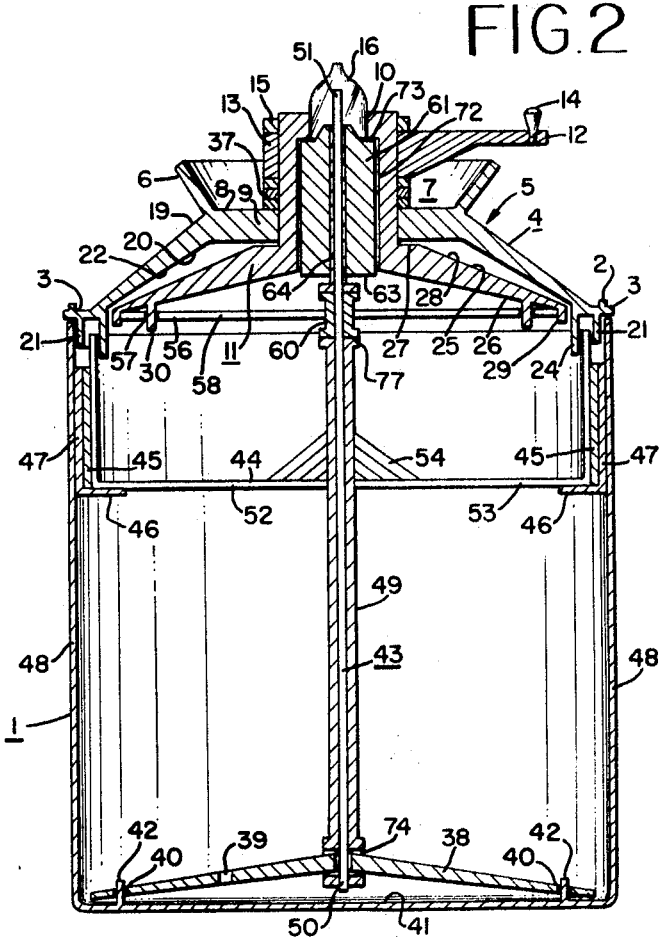
FIG.2
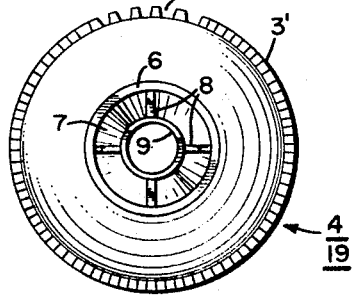
FIG.4a
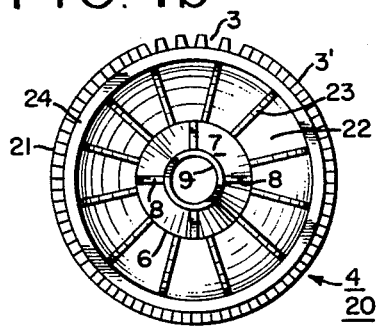
FIG.4b
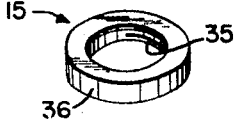
FIG.3a
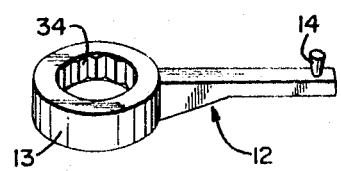
FIG.3b
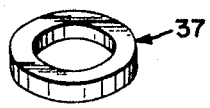
FIG.3c
FIG.3d
INVENTOR.
SAMUEL HERTZBERG PATENTED AUG 3 1971  3,596,589
SHEET 2 OF 2
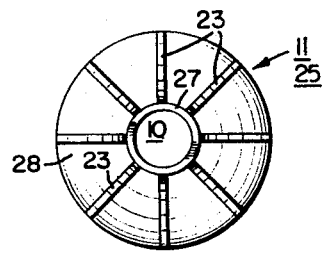
FIG.5a
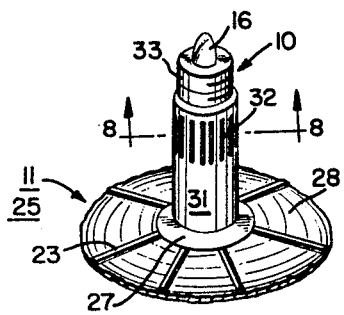
FIG.6
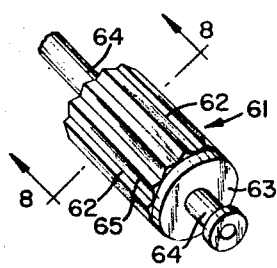
FIG.7
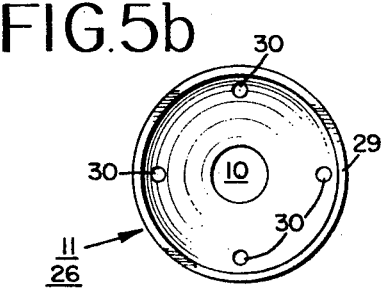
FIG.5b
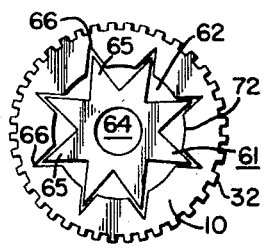
FIG.8
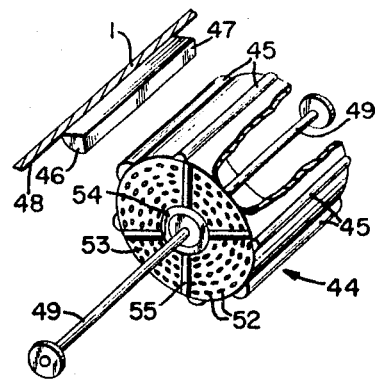
FIG.9
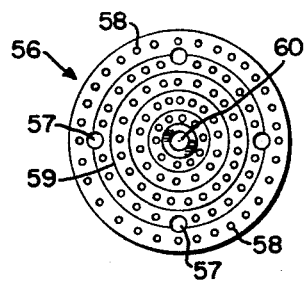
FIG.10
FIG.12
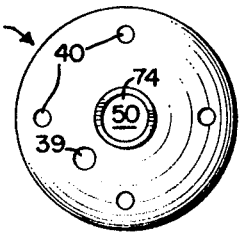
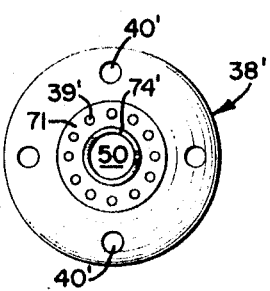
FIG.13
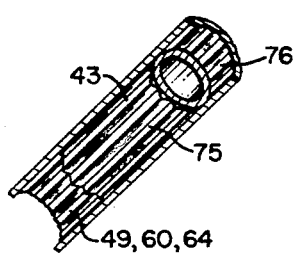
FIG.11
FIG.14
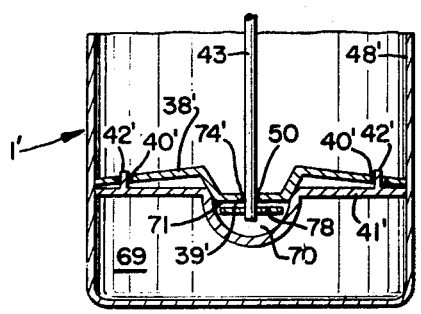
INVENTOR.
SAMUEL HERTZBERG

COFFEEMAKERS

It is established that the coffee bean, once roasted, begins to deteriorate on contact with air. The oils, to which are attributed the qualities connoisseurs cherish, become rancid. This process is hastened by the fragmentation of the coffee bean. It follows, therefore, that consumption should take place as soon after roasting as feasible; and the grinding of the beans should assuredly be deferred to the last moment possible.

Most families no longer grind their own coffee. This may be attributed to a number of factors. Ground coffee, put up in vacuum tins, keeps fresh longer than before the advent of this type of packaging. Coffee mills cost money; they are an additional encumbrance in the kitchen; they must be manipulated in order to fragment the coffee beans.

My invention, a novel arrangement whereby a coffee grinder is incorporated in the lid seated on the bowl of the coffeemaker, is designed to overcome or at least compensate for these difficulties. A single mechanism, possibly more aesthetic in appearance than the coffee percolator it resembles, it takes up about the same amount of space as would a percolator; it assuredly is less of an encumbrance than would be a percolator and a coffee grinder as individual units. It is less expensive than would be the combination of individual units it is designed to replace. Furthermore, the time consumed in grinding the coffee is at least partially balanced by the fact that the grind is (in my invention) directly voided into the bowl interior, exactly where it would otherwise have to be placed. Even the water can be introduced through the same center gap in the lid as are the coffee beans. In short, the inconvenience of grinding is adequately compensated for; the resulting improved brew, all other things being equal, is in the nature of a bonus.

In the accompanying drawing there is revealed an illustrative embodiment of the invention from which these and other objects, novel features and advantages will be readily apparent.

FIG. 1 is a view in perspective of the invention;

FIG. 2 is a section on the lines 2–2 of FIG. 1 and is designed to reveal how the members comprising the invention cooperate;

FIGS. 3a—3d give three perspective and one plan view of various members which can be positioned about the cupola of the interior platform of the lid;

FIGS. 4a—4b give plan views of the upper and lower faces of the exterior platform of the lid;

FIGS. 5a—5b provide similar views of the interior platform of the lid;

FIG. 6 depicts in perspective a portion of the upper face of the interior platform of the lid revealing particularly the details of the cupola;

FIG. 7 illustrates in perspective a fluted water spreader pillar designed to be fitted into the cupola interior;

FIG. 8 is a section on the lines 8–8 of FIGS. 6 and 7 showing the working relationship between the cupola and the fluted water spreader pillar fitted into the interior thereof;

FIG. 9 is a view in perspective of the basket forming a part of the interior structure of the coffeemaker bowl and reveals, in particular, the relationship between the buttresses affixed to the basket and the support sleeves affixed to the interior wall of the bowl;

FIG. 10 is a plan view of a water spreader plate, part of the structure emanating from the bowl interior;

FIG. 11 shows in perspective a splined portion of the pump stem surrounded by a sectioned portion of a cooperating internally splined stem which could be affixed to the basket, a water spreader plate, or a fluted water spreader pillar;

FIG. 12 is a plan view of the pump plate of FIG. 2;

FIG. 13 is a plan view of the pump plate of FIG. 14; and

FIG. 14 is a sectioned view of the base portion of an electric percolator depicting the relationship between the specialized pump and the water well conventionally found in such percolators.

The coffeemaker of my invention is an integrated mechanism combining the functions of a coffee grinder and a percolator. The nature of the interior structure, with minor adaptations, allows for brewing by the open pot and drip pot methods as well. There are two basic forms of the invention founded on the manner of the application of torque to accomplish the fragmentation of the coffee beans. Both will be described in due course.

The preferred form of my invention can be seen, assembled, in FIG. 1. Visible there is the bowl 1 with a spout 18 and a handle 17. The crenelated rim 2 of the bowl 1 and the crenelated rim 3 of the exterior platform 4 of the lid 5 are interlocked, therefore clamped together, to maintain the exterior platform 4 stationary. Discernible, too, is the circular boundary 6 of the center gap 7 of the exterior platform 4 (through which the coffee beans are infused and through which the water for the brew may be poured). Ribs 8 rigidly connect a collar 9, located in the center gap 7, and the circular boundary 6. This collar 9 is penetrated by the cupola 10 of the interior platform 11. Also penetrated by, and seated about, the cupola 10 is a single collar segment 37, the ring extremity 13 (of the handle 12 and its knob 14), and the locking nut 15. A viewing glass 16, conventionally affixed, forms a roof for the cupola 10. These members (and two additional collar segments 37) are visible in the upper part of the sectioned view of FIG. 2, exceptions being the handle 17 and the spout 18 (which are excluded by the lines 2–2 of FIG. 1).

Further clarification of the relationships so far indicated is necessary. FIG. 2, therefore, should be studied in conjunction with the other figures of the drawing which depict the individual members.

The coffeemaker lid 5 consists essentially of the exterior platform 4 and the interior platform 11 locked rotatably by associated members, the former (in this form of the invention) designed to be maintained stationary while torque is applied to the latter.

FIG. 4a gives a plan view of the upper face 19 of the exterior platform 4. The constituent members have already been described. It must be noted, however, that the crenelated rim 3 should be maintained for the entire circumference involved; and this applies as well to the lower face 20 of FIG. 4b. The reason obviously is to secure a clamping relationship with the cooperating crenelated rim 2 of the bowl 1. The smooth portion, designated as the rim 3', can be utilized (if maintained for the entire circumference) in an alternative clamping means. In that method the projecting ring 21 emanating from the lower face 20 of the exterior platform 4 (FIG. 4b), threaded on the side where it contacts the interior wall 48 of the bowl 1 at the rim 2 thereof, cooperates with corresponding threads in the said interior wall 48. In that case, though not mandated, it would appear desirable to eliminate the crenelations from the bowl 1. For the rest, FIG. 4b indicates that the lower face 20 has a milling surface 22 (with corrugations 23) which extends from the circular boundary 6 of the center gap 7 to the circular exit lip 24. The latter, as can be ascertained from FIG. 2, is formed and positioned to assure that the ground coffee will void directly into the basket 44 in the bowl 1 interior.

The upper face 25 of the interior platform 11 is the subject of FIG. 5a. It has the cupola 10, at the top and centrally located, dominating a shoulder 27 and an inclined milling surface 28 (with corrugations 23) designed to cooperate with the milling surface 22 of the exterior platform 4. The lower face 26 of the interior platform 11 (FIG. 5b) is of substantially hollow domelike configuration with a circular exit lip 29, formed and positioned to cooperate with the exit lip 24 of the exterior platform 4, and clamping projections 30, designed to cooperate with the clamping holes 57 of the water spreader plate 56 (FIG. 2 and FIG. 10). Incidentally, the indicated configuration for the lower face 26 is optional if the coffeemaker is to be utilized merely for open pot or drip pot brewing, or if it is not desired to include all of the internal structure emanating from the bowl 1 interior (which has yet to be described).

FIG. 6 depicts in perspective the central portion of the upper face 25 of the interior platform 11; it is intended to more precisely indicate the treatment of the cupola 10 which tops it and is of essentially cylindrical configuration. FIGS. 3a—3c should be read in conjunction. The cupola 10 has, above the shoulder 27, a smoothly finished section 31 followed by a splined section 32 and a threaded section 33 of smaller diameter. Assembled as in FIG. 2, the cupola 10 has penetrated the collar 9 (which has settled on the shoulder 27 and rotatably surrounds the lower portion of the smoothly finished section 31). The balance of the smoothly finished section 31 is devoted to the three collar segments 37 (FIG. 3c). It is to be noted, parenthetically, that if the collar segments 37 are inserted instead beneath the collar 9 rather than above it the effect will be to raise the collar 9 and to proportionately augment the space separating the milling surface 22 of the exterior platform 4 from the cooperating milling surface 28 of the interior platform 11; and this raising of the exterior platform 4 obviously alters the quality of the grind. The splined section 32 seats the ring extremity 13 of the handle 12, the said ring extremity 13 having internal splines 34 which complement those of the splined section 32. Thereby, it is possible to transmit torque from the handle 12 through the knob 14 to the cupola 10, and the interior platform 11 will revolve or oscillate depending on the type of application (FIG. 3b). Finally, the threaded section 33 accommodates the cooperating nut 15 (FIG. 3a), which has internal threads 35 whereby the platforms 4 and 11 are locked together rotatably. The milled circumference 36, optional, should facilitate the locking process.

This completes the assembling of the lid 5 which, properly seated on the bowl 1, provides a functioning mechanism suitable for open pot brewing. Coffee beans can be infused through the center gap 7. With the exterior platform 4 maintained stationary by the clamping of its crenelated rim 3 to the crenelated rim 2 of the bowl 1, the knob 14 can be grasped and the handle 12 manually rotated or oscillated to apply torque to the cupola 10. The interior platform 11 will rotate or oscillate; and the beans will be fragmented by the action of the cooperating milling surfaces 22 and 28. The exit lips 24 and 29 are formed and positioned to void the ground coffee into the bowl 1 interior. The grinding concluded, it is only necessary (if not previously done) to pour the correct amount of water into the bowl 1 and to bring the contents to a boil. The water may be added through the center gap 7. The lid 5 may, of course, remain seated on the bowl 1 during the serving.

The grinding may be done by electric motor. This would require only minor changes in structure. The splined section 32 and the threaded section 33 of the cupola 10 could be transposed. This would require additionally that the diameters of the sections 32 and 33 be interchanged so that the nut 15 can be seated on the transposed threaded section 33 to lock together the platforms 4 and 11. An electric motor, properly supported, could then provide the torque through the medium of a spindle proportioned to cooperate with the transposed splined section 32.

For a percolator type of coffeemaker, structure emanating from the interior of the bowl 1 is mandatory. Such a structure can be fashioned so that the lower face 26 of the interior platform 11 will abut an upper portion of it and thereby receive support supplementing that provided by the locking action of the nut 15. Indeed, such a stabilizing structure (with appropriate modifications) is desirable regardless of the type of brewing method adopted.

FIG. 12 gives a plan view of the pump plate 38; it has a pump hole 39 and a center hole 74 to which the lower extremity 50 of the pump stem 43 (which is hollow) is rigidly affixed perpendicular to the pump plate 38. Additionally, it has clamping holes 40 which (as indicated in FIG. 2) are engaged by clamping projections 42 (part of the substance of the interior base wall 41 of the bowl 1) when the pump plate 38 is correctly positioned inside the bowl 1. Thus, an axial stance is established for the pump stem 43 which rises into the interior of the cupola 10 proximate to the viewing glass 16, terminating as the upper extremity 51.

A basket 44 is the subject of FIG. 9. Pierced by the pump stem 43, it is supported rigidly positioned in the upper portion of the bowl 1. This is accomplished in two ways. First, the buttresses 45 affixed to the basket 44 fit into the sleeves 47 attached to the substance of the interior wall 48 of the bowl 1, resting on the bases 46 thereof. Second, the basket stem 49 (which is integrated with the basket 44) is hollow and internally splined so that, forced down on the pump stem 43 commencing at the upper extremity 51, it will engage the external splines of the pump stem 43, the pump plate 38 at the center hole 74 serving as a support comparable to the bases 46 of the sleeves 47. FIG. 11 illustrates this splining arrangement, the external splines 75 of the pump stem 43 complementing the internal splines 76 of the basket stem 49. Thus, clamping means cooperatively associate the substance of the base interior wall 41 and the interior wall 48 of the bowl 1 with the pump plate 38, the sleeves 47, the buttresses 45, the basket 44, the basket stem 49, and the pump stem 43 itself to maintain the pump stem 43 axial. The same clamping means, by here interdicting rotation of the pump stem 43, maintain it (as will later be demonstrated) compatible with the torque applied at the platforms 4 and 11 level.

For the rest, the basket 44 has water holes 52 only in the base 53 and arranged so that they avoid the inclined center portion 54 of the latter. The reason for this is to assure that the ground coffee, voided directly into the basket 44 by the exit lips 24 and 29 and tending to settle away from the inclined center portion 54, will nevertheless receive the full flow of water dripping from above during the percolating process. In making coffee by the drip pot method (for which no additional structure is mandated), a substitute basket 44 might be furnished which would be identical in all respects except that it would have fewer water holes 52. Thereby, the hot water poured through the center gap 7 will be detained in the basket 44 long enough for this type of brewing. And for open pot brewing a substitute basket 44 could be provided which would eliminate the base 53 but retain the integrating struts 55. The intent behind these suggestions (respecting open pot and drip pot brewing) is to indicate how an internal structure essential to a percolator type coffeemaker can be adapted to the other two types of brewing, providing thereby the advantage of a single mechanism and the advantage inhering in the interior platform 11 abutting such a structure.

The water spreader plate 56, visible in the plan view of FIG. 10, is positioned above the basket 44 in abutment with the lower face 26 of the interior platform 11, to which it is clamped when the clamping holes 57 are engaged by the clamping projections 30. It has an abbreviated stem 60 which is smoothly hollow; and this stem 60 is designed to be fitted on the pump stem 43 by insertion over the upper extremity 51 of the latter. The detent relationship with the basket stem 49 assures correct positioning once it is pierced by the pump stem 43. The pump stem 43, from its upper extremity 51 down to the point of detention 77 of the stem 60, must be devoid of splines 75 (i.e., it must be smoothly cylindrical) in order to permit a rotatable relationship between the pump stem 43 and the stem 60. This relationship renders the water spreader plate 56 rotatably compatible with the interior platform 11, since they must rotate and oscillate together. Obviously, the smoothly cylindrical portion of the pump stem 43 must have a smaller diameter than the lower portion with the splines 75 to permit the basket stem 49 to be seated. Raised circular bands 59 may be utilized on the water spreader plate 56 to assure that all of the water holes 58 will get their fair share of the water.

The fluted water spreader pillar 61 is the subject of the perspective view of FIG. 7 and the sectioned view of FIG. 8. It has flutes 62 to permit (when positioned in the cupola 10 interior) a flow of water from the upper extremity 51 of the pump stem 43 down to the water spreader plate 56. It may have a circular base 63 designed to direct the water coursing down the flutes 62 outward for better dispersal; and in that event the proportions of the pillar 61 and its positioning in the cupola 10 must assure that it will not plug up the latter. FIG. 1 indicates that the pillar 61 extends upward to the shoulder 73 of the interior wall 72 of the cupola 10 and downward sufficiently to permit egress of the water from the cupola 10. FIG. 8 demonstrates that the pillar 61 is clamped to the interior wall 72 of the cupola 10 by means of the interior splines 66 of the latter accepting the splines 65 of the former. The intrusion of the interior wall 72 substance into the flutes 62, the result of this arrangement, still leaves sufficient space for the water to course downward. The hollow pillar stem 64 is smoothly cylindrical and, inserted on the pump stem 43 by way of the upper extremity 51, it provides for rotatable compatibility of the pillar 61 with the interior platform 11. Furthermore, the pillar stem 64 assures proper positioning of the pillar 61 since it rests on the water spreader plate stem 60 in a detent relationship (FIG. 2).

It must now be apparent that the pump stem 43, though clamped rigidly into position (by methods already described) and itself incapable of rotation, is nevertheless compatible with the torque applied at the platforms 4 and 11 level since it is axial and does not interdict rotation and oscillation of the interior platform 11.

Variations in structure are permissible in this form of the invention; they will produce the same results, though possibly not as efficiently. Thus, either the water spreader plate 56 or the fluted water spreader pillar 61 may be eliminated; indeed, both may be eliminated since they are desirable rather than mandated members. Neither need be clamped to the interior platform 11; they may merely be in abutment with it. They may, in that event, even have their stems 60 and 64 splined to the pump stem 43 (in the manner indicated in FIG. 11). And they would, nevertheless, meet the test of rotatable compatibility since though not themselves rotatable in this condition they would not prevent the rotation and oscillation of the interior platform 11. Similarly, the pump plate 38 need not be clamped to the interior base wall 41 and the basket stem 49 need not be splined to the pump stem 43; and the result would be a rotatable pump stem 43 which would still be axial (because of the basket stem 49) and compatible with the torque applied at the platforms 4 and 11 level (because it did not interdict rotation and oscillation of the interior platform 11).

The second form of the invention, to which attention is now invited, requires the application of torque to the exterior platform 4 while the interior platform 11 is maintained stationary. The members utilized in the first form are utilized here as well, and they will cooperate similarly for the most part, but certain modifications are mandated. To avoid redundancy, therefore, only the modifications will be described.

The exterior platform 4 rim 3 and the bowl 1 rim 2, in the preferred form of the invention, are interlocked by means of crenelations. Here, as a minimum, the clamping together of the rims 2 and 3 is interdicted so as to permit the exterior platform 4 to rotate and oscillate on the bowl 1. The easiest way to achieve this is to eliminate the crenelations entirely, substituting continuous rims 2' and 3'.

In order to maintain the interior platform 11 stationary, the structure emanating from the interior of the bowl 1 and abutting the lower face 26 of the said platform 11 is essential. This structure must provide (by clamping, as already described for the preferred form) a pump stem 43 axially positioned and incapable of rotation, so that it may be compatible with the torque applied to the exterior platform 4 which (in the grinding process) will be at least partially transmitted to the interior platform 11. Clamping variations indicated for the preferred form are only permissible here if they do not contradict this basic prescription. Either a water spreader plate 56 or a fluted water spreader pillar 61, preferably both, clamped to the lower face 26 of the interior platform 11 (as described for the preferred form) is mandatory; and this member 56 or 61 should also be splined to the pump stem 43 (which pierces it) in the manner indicated in FIG. 11. Thus, the member 56 or 61 will be rotatably compatible; i.e., it will not be able to rotate, thereby preventing rotation of the interior platform 11.

Torque may be applied to the exterior platform 4 by a variety of methods. These alternatives are illustrated in the plan view of FIG. 3d. A hand may be positioned about the circular boundary 6' and utilized to produce torque. Or a handle 12' with a knob 14' affixed to the circular boundary 6' can be grasped for the purpose. A mere knob 14' affixed to the circular boundary 6' can be utilized. A bridge 67, rigidly connected to the circular boundary 6', may arch over the center gap 7 and the cupola 10; and this may be grasped and manipulated to produce torque. Indeed, a splined projection 68, centered on such a bridge 67, may cooperate with a properly proportioned spindle of an electric motor to provide the torque. In any event, the splined section 32 of the cupola 10 and the handle 12 clamped to it (described in connection with the preferred form of the invention) become superfluous structure or even an impediment, and should be eliminated here. Various expedients will occur to those familiar with the art; the simplest device would be to retain the ring extremity 13 of the handle 12 clamped to the splined section 32 while eliminating the balance of the member.

Both forms of the invention may be utilized in an electric percolator. The plan view of FIG. 13 and the sectioned view of FIG. 14 demonstrate this. In the latter, the bowl 1' has a heating compartment 69 (such as is to be found in the vast majority of electric percolators) with a depressed heating well 70 (also conventional). The base interior wall 41' has clamping projections 42' which engage the clamping holes 40' of the pump plate 38'. The center of the pump plate 38' is depressed to seat in the upper part of the heating well 70; it incorporates a circle of pump holes 39' and beneath a stopper plate 78, the two comprising the specialized pump 71. The center hole 74' is pierced by the rigidly affixed lower extremity 50 of the pump stem 43, which descends into the heating well 70 to a point slightly below the stopper plate 78; the pump stem 43 is thereby positioned perpendicular to the pump plate 38'. The clamping means already described will cooperatively associate the members comprising the balance of the structure emanating from the interior of the bowl 1' and the substance of the interior base wall 41' and interior wall 48' to maintain the pump stem 43 axial and compatible with the torque applied at the platforms 4 and 11 level.

Having now described the two forms of the coffeemaker of my invention, it must be understood that additional modifications and adaptations falling within the scope of the claims may occur to those skilled in the art.

I claim:

1. A coffeemaker comprising at least a bowl and a lid seated thereon incorporating a coffee grinder; the lid having an exterior platform with a center gap for the infusion of coffee beans and a milling surface on its lower face, a collar located in the center gap rigidly connected by at least one rib to the said platform, and an interior platform with an upper face topped by a cupola of essentially cylindrical configuration surrounded by a cooperating milling surface, the cupola penetrating the collar and locked with it for rotary motion; exit lips at the perimeters of the platforms formed and positioned to void the ground coffee into the bowl interior; and means for the application of torque to one of the platforms while the other is maintained stationary.

2. A coffeemaker according to claim 1 further characterized by at least one collar segment insertable on the cupola beneath the collar, thereby raising the exterior platform and altering the quality of the grind.

3. A coffeemaker according to claim 1 further characterized by the cupola of the interior platform having above a smoothly finished section a threaded section, the smoothly finished section seating the collar of the exterior platform and the threaded section accommodating a cooperating nut whereby the platforms can be locked together rotatably.

4. A coffeemaker according to claim 1 further characterized by the lower face of the interior platform abutting a structure emanating from the bowl interior, the said structure including a stem and affiliated members retaining the stem substantially perpendicular to the base wall of the bowl, one of the affiliated members pierced by and supported on the stem substantially at its upper extremity positioned and contoured for rotatably compatible contact with the aforesaid lower face, clamping means associating cooperatively the affiliated members and the interior wall substance of the bowl to maintain the stem axial and compatible with the torque applied at the platforms level.

5. A coffeemaker according to claim 1 further characterized by an interior platform with a lower face abutting a structure emanating from the bowl interior consisting of a pump plate positioned on the base wall of the bowl, a hollow pump stem perpendicularly affixed at one extremity to the pump plate rising toward the interior platform, a basket pierced by the pump stem supported positioned in the upper portion of the bowl permitting the exit lips of the platforms to void the ground coffee therein, and a water spreader member above the basket pierced by and supported on the pump stem itself clamped to and rotatably compatible with the interior platform, clamping means associating cooperatively the enumerated members and the interior wall substance of the bowl to maintain the pump stem axial and compatible with the torque applied at the platforms level.

6. A coffeemaker according to claim 1 further characterized by an interior platform with a lower face of substantially hollow domelike configuration abutting a structure emanating from the bowl interior consisting of a pump plate positioned on the base wall of the bowl, a hollow pump stem perpendicularly affixed at one extremity to the pump plate rising into the cupola of the interior platform, a basket pierced by the pump stem supported positioned in the upper portion of the bowl permitting the exit lips of the platforms to void the ground coffee therein, a water spreader plate above the basket pierced by and supported on the pump stem, and a fluted water spreader pillar positioned substantially within the cupola pierced by and supported on the pump stem, at least one of the latter two members clamped to the lower face of the interior platform and rotatably compatible with it, clamping means associating cooperatively the enumerated members and the interior wall substance of the bowl to maintain the pump stem axial and compatible with the torque applied at the platforms level.

7. A coffeemaker according to claim 1 further characterized by the cupola of the interior platform having above a smoothly finished section a threaded section, the smoothly finished section seating the collar of the exterior platform and the threaded section accommodating a cooperating nut whereby the platforms can be locked together rotatably, as least one collar segment insertable on the cupola beneath the collar thereby raising the exterior platform and altering the quality of the grind; the said interior platform additionally with a lower face abutting a structure emanating from the bowl interior consisting of a pump plate positioned on the base wall of the bowl, a hollow pump stem perpendicularly affixed at one extremity to the pump plate rising toward the interior platform, a basket pierced by the pump stem supported positioned in the upper portion of the bowl permitting the exit lips of the platforms to void the ground coffee therein, and a water spreader member above the basket pierced by and supported on the pump stem itself clamped to and rotatably compatible with the interior platform, clamping mean associating cooperatively the enumerated members and the interior wall substance of the bowl to maintain the pump stem axial and compatible with the torque applied at the platforms level.

8. A coffeemaker according to claim 1 further characterized by means for the application of torque to the exterior platform while the interior platform with a lower face of substantially hollow domelike configuration is maintained stationary by an abutting structure emanating from the bowl interior, the said structure consisting of a pump plate positioned on the base wall of the bowl, a hollow pump stem perpendicularly affixed at one extremity to the pump plate rising into the cupola of the interior platform, a basket pierced by the pump stem supported positioned in the upper portion of the bowl permitting the exit lips of the platforms to void the ground coffee therein, a water spreader plate above the basket pierced by and rigidly supported on the pump stem clamped to the lower face of the interior platform, and a fluted water spreader pillar pierced by and rigidly supported on the pump stem clamped to the cupola interior wall, clamping means cooperatively associating the enumerated members and the interior wall substance of the bowl to maintain the pump stem axial and compatibly immobilized as torque is applied at the platforms level.

9. A coffeemaker according to claim 1 further characterized by the exterior platform maintained stationary by clamping its rim to the rim of the bowl and the interior platform rotatable subject to the application of torque; the cupola of the interior platform having above a smoothly finished section a splined section and a threaded section, the smoothly finished section seating the collar of the exterior platform, the splined section seating a complementary internally splined ring member to which the torque can be applied, and the threaded section accommodating a cooperating nut whereby the platforms can be locked together rotatably; the said interior platform additionally with a lower face of substantially hollow domelike configuration abutting a structure emanating from the interior of the bowl consisting of a pump plate positioned on the base wall of the bowl, a hollow pump stem perpendicularly affixed at one extremity to the pump plate rising into the cupola of the interior platform, a basket pierced by the pump stem supported positioned in the upper portion of the bowl permitting the exit lips of the platforms to void the ground coffee therein, a water spreader plate above the basket pierced by and supported on the pump stem positioned rotatably compatible contacting the lower face of the interior platform, and a fluted water spreader pillar pierced by and supported on the pump stem positioned rotatably compatible contacting the interior wall of the cupola, clamping cooperatively associating the enumerated members and the interior wall substance of the bowl to maintain the pump stem axial and compatible with the torque applied at the platforms level.

10. A coffeemaker according to claim 1 further characterized by the exterior platform maintained stationary by clamping its rim to the rim of the bowl and the interior platform rotatable subject to the application of torque; the cupola of the interior platform having above a smoothly finished section a splined section and a threaded section, the smoothly finished section seating the collar of the exterior platform, the splined section seating a complementary internally splined ring member to which the torque can be applied, and the threaded section accommodating a cooperating nut whereby the platforms can be clocked together rotatably; the said interior platform additionally with a lower face of substantially hollow domelike configuration abutting a structure emanating from the interior of the bowl consisting of a pump plate positioned on the base wall of the bowl, a hollow pump stem perpendicularly affixed at one extremity to the pump plate rising into the cupola of the interior platform, a basket pierced by the pump stem supported positioned in the upper portion of the bowl permitting the exit lips of the platforms to void the ground coffee therein, a water spreader plate above the basket pierced by and supported on the pump stem positioned rotatably compatible clamped to the lower face of the interior platform and a fluted water spreader pillar pierced by and supported on the pump stem positioned rotatably compatible clamped to the interior wall of the cupola, clamping means cooperatively associating the enumerated members and the interior wall substance of the bowl to maintain the pump stem axial and compatible with the torque applied at the platforms level.

75